United States Patent
Welcker

(10) Patent No.: US 7,404,907 B2
(45) Date of Patent: Jul. 29, 2008

(54) REMOVAL AND RECOVERY OF AMMONIUM PERFLUOROOCTANOATE (APFO) FROM CONTAMINATED WATER

(76) Inventor: Kelydra Elizabeth Welcker, 1939 Homewood Rd., Parkersburg, WV (US) 26101

( * ) Notice: Subject to any disclaimer, the term of this patent is extended or adjusted under 35 U.S.C. 154(b) by 76 days.

(21) Appl. No.: 11/636,951

(22) Filed: Dec. 12, 2006

(65) Prior Publication Data

US 2007/0138110 A1 Jun. 21, 2007

Related U.S. Application Data

(60) Provisional application No. 60/843,585, filed on Sep. 11, 2006, provisional application No. 60/751,466, filed on Dec. 19, 2005.

(51) Int. Cl.
*C02F 1/32* (2006.01)
*C02F 1/00* (2006.01)

(52) U.S. Cl. .................. 210/748; 562/605; 204/554

(58) Field of Classification Search ............... 210/748; 562/605; 204/554
See application file for complete search history.

(56) References Cited

U.S. PATENT DOCUMENTS

| | | | | |
|---|---|---|---|---|
| 6,613,941 | B1 * | 9/2003 | Felix et al. | 562/605 |
| 2003/0222017 | A1 * | 12/2003 | Fulton et al. | 210/634 |
| 2007/0027251 | A1 * | 2/2007 | Hintzer et al. | 524/544 |

* cited by examiner

*Primary Examiner*—Walter D. Griffin
*Assistant Examiner*—Cameron J Allen

(57) ABSTRACT

Ammonium perfluorooctanoate—also called APFO, PFOA or C8—is a surfactant associated with the production of Teflon®, and is also present in products such as fire-fighting foams and may be formed from the microbial degradation of grease-resistant coatings applied to items such as pizza boxes. APFO itself does not hydrolyze, photolyze, or biodegrade under environmental conditions and is biologically additive. A process by which APFO may be removed and recovered from water by electrosorption is discovered. Removal and recovery by electrosorption form an inexpensive and environmentally friendly method of removal and recovery of APFO.

3 Claims, No Drawings

US 7,404,907 B2

REMOVAL AND RECOVERY OF AMMONIUM PERFLUOROOCTANOATE (APFO) FROM CONTAMINATED WATER

CROSS-REFERENCE TO RELATED APPLICATIONS

Provisional patent applications pending U.S. 60/751,466 filed Dec. 12, 2005 and U.S. 60/843,585 filed Sep. 11, 2006.

STATEMENT REGARDING FEDERALLY SPONSORED RESEARCH OR DEVELOPMENT

This research is not sponsored by or paid for by any Federal agency.

REFERENCE TO SEQUENCE LISTING, ETC.

Not Applicable

BACKGROUND OF THE INVENTION

1. Field of the Invention

The present invention relates to the removal and/or recovery of the fluorinated surfactant APFO from water, in particular from drinking or waste water that is contaminated with APFO.

2. Description of the Related Art

Current technology for the removal of APFO from contaminated drinking water utilizes granular activated carbon (GAC). Current technology for the removal of APFO from waste water utilizes either granular activated carbon or ion exchange resins. However, current technology is not 100% efficient at removing extremely low concentrations of APFO. According to page 35 of the February 2006 Report to the Senate Environment Committee titled, "INVESTIGATION OF PERFLUOROCHEMICAL (PFC) CONTAMINATION IN MINNESOTA, PHASE ONE, by Fardin Oliaei, Ph.D., Former Emerging Contaminants Program Coordinator, Don Kriens, M. S., P. E., Principal Engineer, and Katrina Kessler, M. S., Staff Engineer, the activated carbon systems installed for the Cottage Grove, Minn. plant site were only 46% efficient for the removal of APFO.

GAC filters installed in the Mid-Ohio Valley by the DuPont Company in partial settlement of the APFO-contamination class-action lawsuit were expected to have a five-year replacement life, but saturated in less than four months. The use of electrosorption for the removal and recovery of APFO is a new, inexpensive and efficient technique for purification of either drinking or wastewater contaminated with APFO. Felix, et.al. (U.S. Pat. No. 6,613,941) in his development of a method for recovering parts per million of fluorinated alkanoic acids from waste waters, utilized adsorption to an anion-exchange resin as the basis for the removal and recovery process and included electrocoagulation to precipitate colloids interfering with the anion exchange resin. While moderately effective at parts per million concentration levels, these techniques are ineffective at removing the extremely low levels of APFO currently found in drinking water.

BRIEF SUMMARY

APFO may be removed and recovered from solution by electrosorption. Recovery of APFO may be accomplished by either current reversal or solvent rinsing of the electrodes. Felix, et.al. (U.S. Pat. No. 6,613,941) in his development of a method for recovering fluorinated alkanoic acids from waste waters, utilized adsorption to an anion-exchange resin as the basis for the removal and recovery process. Felix et.al. utilized the process of electrocoagulation as a way to precipitate colloids interfering with the anion exchange resin in his removal process. The primary difference between these two processes is that electrocoagulation is a redox-reaction—whereas electrosorption is an electrostatic phenomena. Felix et.al uses electrodes as a way of removing colloids from solution—not as a way of removing the fluorinated surfactant. Furthermore, Felix, et.al. (U.S. Pat. No. 6,613,941) refers to the use of activated carbon as a final removal step and refers to removal of concentrations of 1200 mg/L or 1200 parts per million. Electrosorption is effective in removing and recovering APFO concentrations at either the part per billion range—a factor of 1000 times less than the concentrations referred to by Felix et.al.—or the parts per million range.

BRIEF DESCRIPTION OF THE SEVERAL VIEWS OF THE DRAWING

Not Applicable—No Drawings Required or Included

DETAILED DESCRIPTION OF THE INVENTION

The present invention relates to a process for removal and recovery of APFO from contaminated water. More particularly, it relates to a process for removal and recovery of APFO from water contaminated with parts per billion and parts per million levels of APFO.

SUMMARY OF THE INVENTION

APFO may be removed from solution by electrosorption. Electrosorption is adsorption to an electrically charged surface. Recovery of APFO may be accomplished by either current reversal or solvent rinsing of the electrodes. The use of electrosorption is an efficient technique for the removal of APFO due to the fact that when a surface is immersed in an aqueous solution, a discontinuity is formed at the interface where such physicochemical variables as electrical potential and electrolyte concentration change significantly from the aqueous phase to another phase. Because of the different chemical potentials between the two phases, charge separation often occurs at the interfacial region. This interfacial region, together with the charged surface, is known as the diffuse electrical double layer (EDL). For the removal and recovery of APFO, there are three factors that lead to the concentration of APFO at the electrodes. The first is the obvious attraction of the electrode to its oppositely charged ion (the PFO anion is attracted to the positive electrode, while $NH_4$ cation is attracted to the negative electrode). An electrical double layer forms at each electrode attracting the counter ions. Thus $NH_4$ cation forms the secondary layer at the positive electrode and the PFO anion forms the secondary layer at the negative electrode. Second, APFO is a surfactant and is drawn to any interface, and forms a microlayer at the surface and on the electrodes. The microlayer contains an average of 1.5 times more APFO than the bulk solution. Third, APFO has an extremely hydrophobic fluorocarbon tail, so that if the first two factors create a local concentration high enough, micellular formation can further concentrate the APFO at the surface of the electrode. All static and transient-flow test samples documented the formation of a diffuse electrical double layer during electrosorption resulting in APFO being removed and recovered from solution. Static electrosorptive removal and recovery utilized a basic electrolytic cell with stainless steel electrodes, 6-Volt DC current, and coated electrode wires with dual alligator clips. Transient-flow electrosorption utilized identical materials with the addition of charged granular activated carbon to adsorb ions dislodged by the force of the water flow.

The invention will now be further described with reference to the following examples without however the intention to limit the invention thereto. Practical embodiments of the present invention are shown in the following examples. Concentrations are in parts per million (ppm) and parts per billion (ppb).

EXAMPLE 1

Starting with 100 ml of a 25-ppm solution of APFO-contaminated water with an initial hardness level of 2 ppm, a 6-volt heavy duty battery and 3.6 mm wide stainless steel electrodes, static electrosorption reduced water contamination from 25 ppm to 14 ppm in 9.5 hours.

EXAMPLE 2

Starting with 100 ml of a 10-ppm solution of APFO-contaminated water with an initial hardness level of 0 ppm, a 6-volt heavy duty battery and 3.6 mm wide stainless steel electrodes, static electrosorption reduced water contamination from 10 ppm to 5.93 ppm in 72 hours.

EXAMPLE 3

Starting with 100 ml of a 100-ppb solution of APFO-contaminated water with an initial hardness level of 0 ppm, a 6-volt heavy duty battery and 3.6 mm wide stainless steel electrodes, static electrosorption reduced water contamination from 100 ppb to 38.7 ppb in 24 hours.

EXAMPLE 4

Starting with 100 ml of a 50-ppb solution of APFO-contaminated water with an initial hardness level of 0 ppm, a 6-volt heavy duty battery and 3.6 mm wide stainless steel electrodes, static electrosorption reduced water contamination from 50 ppb to 21.3 ppb in 24 hours.

EXAMPLE 5

Starting with 1.89 liters of a 7.01 ppb of water collected from an APFO contaminated cistern, with an initial hardness level of 200 ppm, a 6-volt heavy duty battery and 3.6 mm wide stainless steel electrodes, 22.39% of the APFO was removed from solution over a 12-hour period by localized static electrosorption.

EXAMPLE 6

Starting with 500 ml of tap water containing an initial concentration of 3.80 ppb APFO, stainless steel mesh electrodes and passing the water over the electrodes with a flow rate of 250 ml/hour using 6V DC current produced a transient slow-flow electrosorption process which removed 36% of the APFO.

EXAMPLE 7

Starting with 500 ml of tap water containing 3.80 ppb APFO and stainless steel mesh electrodes separated by granular activated carbon (GAC), and passing the water over the electrodes with a flow rate of 250 ml/hour using 6V DC current produced a transient slow-flow electrosorption process capable of removing 100% of the APFO.

EXAMPLE 8

Starting with drinking water contaminated with 1-10 ppb APFO and following passage through a PVC column with stainless steel mesh electrodes, 6V DC current, and containing granular activated carbon, 100% of APFO is removed with a flow rate of 250-ml per hour.

EXAMPLE 9

Starting with either APFO contaminated drinking water or environmental samples in concentrations up to 100 parts per million, PVC column enhancements including: varying the size of the column; the size of the electrodes; amount of granular activated carbon and/or varying the flow rate—produced a statistically significant reduction in APFO in finished water. This method is designed for environmental remediation of APFO contamination in surface water or as a final purification step in water treatment facilities.

EXAMPLE 10

Tabletop removal devices utilizing transient slow-flow electrosorption enhanced by granular activated carbon effectively reduces the concentration of APFO from contaminated drinking water.

What is claimed is:

1. A process for removal and recovery of APFO from water using electrosorption forming a diffuse electrical double layer on charged electrodes comprising the steps of: a) obtaining an aqueous solution of 1-ppb (part per billion) to 100-ppm (parts per million) APFO; b) inserting into the solution two stainless steel electrodes connected by alligator clips and coated electrode wires to a DC current; c) current flow attracting and adsorbing by double-layer electrosorption the ions formed by the dissociation of APFO; d) removing APFO by removing APFO-contaminated electrodes are removed from solution or by suction-removal of liquid adjacent to the electrodes; e) rinsing APFO-contaminated electrodes with acetone and evaporating the acetone or by placing electrodes into distilled water and reversing the current.

2. The process of claim 1 where said DC current is 6 Volts.

3. A process for the removal and recovery of APFO from contaminated drinking or waste waster using electrosorption enhanced by granular activated carbon comprising the steps of: a) obtaining water contaminated with APFO from 1-ppb to 100-ppm; b) allowing contaminated water to flow over granular activated carbon packed around stainless steel electrodes connected by alligator clips and coated electrode wires to a 6-Volt DC current; c) attracting and adsorbing by electrosorption the ions formed by the dissociation of APFO with the granular activated carbon; d) removing and recovering is accomplished by eluting the electrodes and granular activated carbon with acetone, and collecting the elutant and evaporating the solvent.

* * * * *